United States Patent
Govindu et al.

(10) Patent No.: US 9,569,214 B2
(45) Date of Patent: Feb. 14, 2017

(54) EXECUTION PIPELINE DATA FORWARDING

(71) Applicant: NVIDIA Corporation, Santa Clara, CA (US)

(72) Inventors: Gokul Govindu, San Francisco, CA (US); Parag Gupta, San Jose, CA (US); Scott Pitkethly, San Francisco, CA (US); Guillermo J. Rozas, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 508 days.

(21) Appl. No.: 13/728,765

(22) Filed: Dec. 27, 2012

(65) Prior Publication Data
US 2014/0189316 A1    Jul. 3, 2014

(51) Int. Cl.
*G06F 9/30*    (2006.01)
*G06F 9/38*    (2006.01)

(52) U.S. Cl.
CPC ......... *G06F 9/30079* (2013.01); *G06F 9/3826* (2013.01); *G06F 9/3834* (2013.01)

(58) Field of Classification Search
None
See application file for complete search history.

(56) References Cited

U.S. PATENT DOCUMENTS

| 5,123,108 A * | 6/1992 | Olson ................. G06F 9/3826 712/218 |
| 5,148,529 A * | 9/1992 | Ueda .................. G06F 9/3826 712/218 |
| 5,487,146 A | 1/1996 | Guttag et al. |

(Continued)

FOREIGN PATENT DOCUMENTS

| CN | 1519728 A | 8/2004 |
| CN | 1629799 A | 6/2005 |

(Continued)

OTHER PUBLICATIONS

"Intel Itanium Architecture Software Developer's Manual", Intel, http://www.intel.com/design/itanium/manuals/iiasdmanual.htm, 1 page.

(Continued)

*Primary Examiner* — Steven Snyder

(57) ABSTRACT

In one embodiment, in an execution pipeline having a plurality of execution subunits, a method of using a bypass network to directly forward data from a producing execution subunit to a consuming execution subunit is provided. The method includes producing output data with the producing execution subunit, consuming input data with the consuming execution subunit, for one or more intervening operations whose input is the output data from the producing execution subunit and whose output is the input data to the consuming execution subunit, evaluating those one or more intervening operations to determine whether their execution would compose an identify function, and if the one or more intervening operations would compose such an identity function, controlling the bypass network to forward the producing execution subunit's output data directly to the consuming execution subunit.

20 Claims, 4 Drawing Sheets

(56) References Cited

U.S. PATENT DOCUMENTS

| | | | |
|---|---|---|---|
| 5,537,561 A * | 7/1996 | Nakajima | G06F 9/3824 712/216 |
| 5,721,855 A | 2/1998 | Hinton et al. | |
| 5,864,692 A | 1/1999 | Faraboschi et al. | |
| 5,870,582 A | 2/1999 | Cheong et al. | |
| 5,956,753 A | 9/1999 | Glew et al. | |
| 6,229,754 B1 * | 5/2001 | Carter et al. | G11C 8/16 365/189.04 |
| 6,519,694 B2 | 2/2003 | Harris | |
| 7,010,648 B2 | 3/2006 | Kadambi et al. | |
| 7,062,631 B1 | 6/2006 | Klaiber et al. | |
| 7,117,330 B1 | 10/2006 | Alverson et al. | |
| 7,194,604 B2 | 3/2007 | Bigelow et al. | |
| 7,293,161 B1 | 11/2007 | Chaudhry et al. | |
| 7,421,567 B2 | 9/2008 | Eickemeyer et al. | |
| 7,752,627 B2 | 7/2010 | Jones et al. | |
| 7,873,793 B1 | 1/2011 | Rozas et al. | |
| 7,890,735 B2 | 2/2011 | Tran | |
| 8,035,648 B1 | 10/2011 | Wloka et al. | |
| 8,707,011 B1 | 4/2014 | Glasco et al. | |
| 2003/0014614 A1 * | 1/2003 | Jarvis | G06F 9/3013 712/218 |
| 2003/0018685 A1 | 1/2003 | Kalafatis et al. | |
| 2003/0196010 A1 | 10/2003 | Forin et al. | |
| 2004/0128448 A1 | 7/2004 | Stark et al. | |
| 2005/0055533 A1 | 3/2005 | Kadambi et al. | |
| 2005/0138332 A1 | 6/2005 | Kottapalli et al. | |
| 2005/0154831 A1 | 7/2005 | Steely, Jr. et al. | |
| 2006/0010309 A1 | 1/2006 | Chaudhry et al. | |
| 2006/0095678 A1 | 5/2006 | Bigelow et al. | |
| 2006/0149931 A1 | 7/2006 | Haitham et al. | |
| 2006/0174228 A1 | 8/2006 | Radhakrishnan et al. | |
| 2006/0179260 A1 * | 8/2006 | Yoon | G11C 7/1072 711/154 |
| 2006/0212688 A1 | 9/2006 | Chaudhry et al. | |
| 2006/0277398 A1 | 12/2006 | Akkary et al. | |
| 2007/0074006 A1 | 3/2007 | Martinez et al. | |
| 2007/0186081 A1 | 8/2007 | Chaudhry et al. | |
| 2007/0204137 A1 | 8/2007 | Tran | |
| 2009/0019317 A1 | 1/2009 | Quach et al. | |
| 2009/0300335 A1 * | 12/2009 | Muff et al. | G06F 9/30181 712/221 |
| 2009/0327661 A1 | 12/2009 | Sperber et al. | |
| 2010/0205402 A1 | 8/2010 | Henry | |
| 2010/0205415 A1 | 8/2010 | Henry | |
| 2012/0023359 A1 | 1/2012 | Edmeades et al. | |
| 2012/0089819 A1 | 4/2012 | Chaudhry et al. | |
| 2013/0124829 A1 | 5/2013 | Chou et al. | |
| 2014/0082291 A1 | 3/2014 | Van Zoeren et al. | |
| 2014/0122805 A1 | 5/2014 | Ekman et al. | |
| 2014/0136891 A1 | 5/2014 | Holmer et al. | |
| 2014/0281259 A1 | 9/2014 | Klaiber et al. | |
| 2015/0026443 A1 | 1/2015 | Kumar et al. | |

FOREIGN PATENT DOCUMENTS

| | | |
|---|---|---|
| CN | 1831757 | 9/2006 |
| CN | 102184127 | 9/2011 |
| EP | 0671718 | 9/1995 |
| GB | 2287111 | 9/1995 |
| TW | 1275938 | 1/2004 |
| TW | 1263938 | 10/2006 |
| TW | I275938 | 3/2007 |
| TW | 200723111 | 6/2007 |
| TW | 200809514 | 2/2008 |
| TW | I315488 | 10/2009 |
| TW | 201112254 | 4/2011 |
| TW | I425418 | 2/2014 |

OTHER PUBLICATIONS

Adve, S. et al., "Shared Memory Consistency models: A Turorial", WRL Research Report 95/7, Western Digital Laboratory, Sep. 1995, 32 pages.

Altera—"Implementing a Queue Manager in Traffic Management Systems", Feb. 2004, pp. 1-8.

Chaudry, S. et al., "High-Performance Throughput Computing," Micro, IEEE 25.3, pp. 32-45, May 2005, 14 pages.

Dundas, J. et al., "Improving Date Cache Performance by Pre-executing Instructions Under a Cache Miss", Proceedings of the 1997 International Conference on Supercomputing, Jul. 1997, 9 pages.

Holmer, B. et al. "Managing Potentially Invalid Results During Runahead", U.S. Appl. No. 13/677,085, filed Nov. 14, 2012, 29 pages.

Mutlu, O. et al. "Runahead Execution: An Alternative to Very large Instruction Windows for Out-of-order Processors," This paper appears in: "High-Performance Computer Architecture," Feb. 8-12, 2003, 13 pages.

Rozas, Guillermo J. et al., "Checkpointed Buffer for Re-Entry From Runahead," U.S. Appl. No. 13/463,627, filed May 3, 2012, 27 pages.

Rozas, J. et al., "Lazy Runahead Operation for a Microprocessor", U.S. Appl. No. 13/708,645, filed Dec. 7, 2012, 32 pages.

Wikipedia article, "Instruction Prefetch," https://en.wikipedia.org/wiki/Instruction_prefetch, downloaded May 23, 2016.

Dehnert, et al., The Transmeta Code Morphing Software: using speculation, recovery, and adaptive retranslation to address real-life challenges, Mar. 23, 2003, IEEE, CGO '03 Proceedings of the international symposium on Code generation and optimization: feedback-directed and runtime optimization, pp. 15-24.

Ekman, M. et al., "Instruction Categorization for Runahead Operation", U.S. Appl. No. 13/708,544, filed Dec. 7, 2012, 32 pages.

Ekman, M. et al., "Selective Poisoning of Data During Runahead", U.S. Appl. No. 13/662,171, filed Oct. 26, 2012, 33 pages.

Holmer, B., et al., "Managing Potentially Invalid Results During Runahead", U.S. Appl. No. 13/677,085, filed Nov. 14, 2012, 29 pages.

Wikipedia article, "x86," https://en.wikipedia.org/wiki/X86, downloaded May 23, 2016.

NVIDIA Corp. Akquirierung spekulativer Genehmigung jur gemeinsam genutzten Speicher, Mar. 20, 2014, SW102013218370 A1, German Patent Office, All Pages.

* cited by examiner

EXECUTION PIPELINE DATA FORWARDING

BACKGROUND

A micro-processor may include a processing pipeline to allow multiple instructions to be processed simultaneously. More particularly, a micro-processor may include an execution pipeline having multiple execution subunits to allow multiple instructions to be executed simultaneously. Due to this temporal overlap, data flow through a load/store portion (e.g., memory locations) of the execution pipeline may cause data dependences between some instructions.

In one example, data dependencies may be detected as early as a decode stage of the processing pipeline by a scheduler. Depending on when data is available in the load/store portion and when that data is needed for consumption in an execution subunit, the scheduler can send data from the load/store portion through a bypassing network to the execution subunit, or the scheduler can stall execution of the instruction until the data is available in the load/store portion. In either case, some time (e.g., one or more clock cycles) may pass while waiting for the data to become available for use in the load/store portion of the execution pipeline. Accordingly, in some cases, data may not be available for use as quickly as desired.

DETAILED DESCRIPTION

Figure 1:
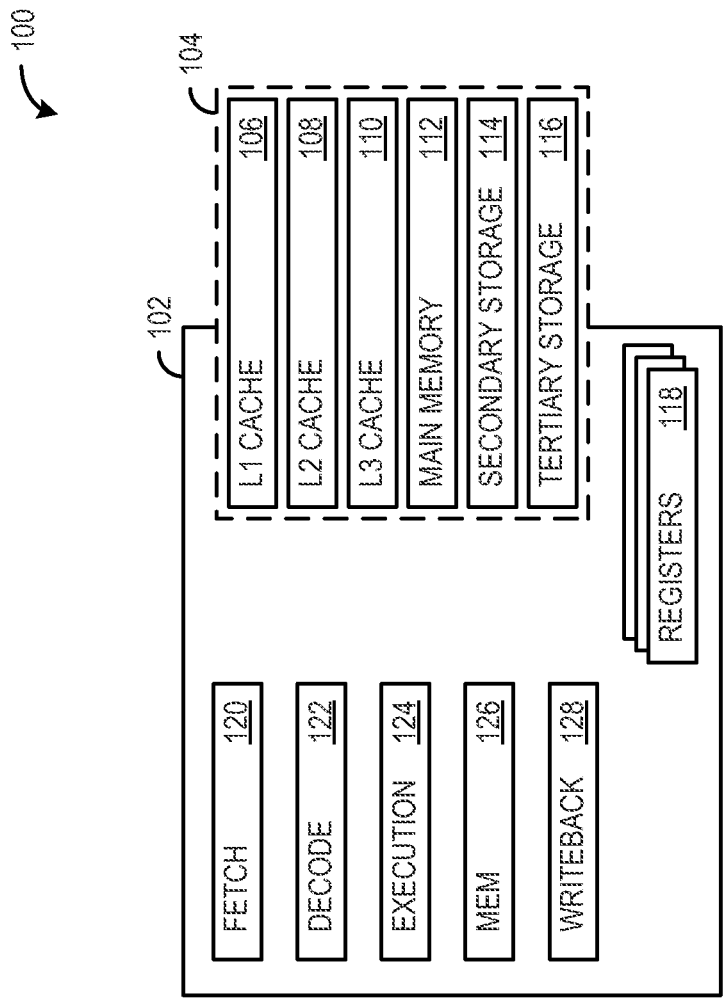
FIG. 1 schematically shows a micro-processing system in accordance with an embodiment of the present disclosure.

The present disclosure sets forth novel systems and methods for controlling an execution pipeline to make data available for consumption more quickly and reduce stalls in the execution pipeline. The disclosure describes a novel method for intelligently detecting opportunities for forwarding data internally within an execution pipeline. The method can efficiently forward data from a data producer to a data consumer without having to wait for the data to pass through a load/store portion of the execution pipeline.

The method herein intelligently detects a data forwarding opportunity by evaluating one or more operations occurring between a data producer and a data consumer. The intervening operations are associated with the producer and consumer in terms of their input and output. Specifically, the producer generates, or "produces," output data which is applied as an input to the first of the intervening operations. The last of the intervening operations generates an output, which is provided as an input to the consumer, which in turn "consumes" the data received from the intervening operations. Restating, the producer's output is the input to the intervening operations; the consumer's input is the output from the intervening operations.

The method detects the forwarding opportunity via affirmatively determining that execution of the intervening operations would result in an identity function. Such an identity function occurs, by definition, when the input to the intervening operations equals the output of the intervening operations. In terms of the producer and the consumer, this means that the producer will generate, as an output, the exact same data that is needed by the consumer as an input. Upon detecting this situation, data can be forwarded directly from producer to consumer. The machine typically executes the intervening operations normally, but the direct forwarding allows the consuming operation to proceed without having to wait for the intervening operations.

A specific example of direct producer-to-consumer forwarding may be illustrated with the following four instructions:

(1) ADD r1=a, b {"producer"}
(2) STORE [addr]=r1{"intervening operation"}
(3) LOAD r2=[addr] {"intervening operation"}
(4) SUB r3=r2, c {"consumer"}

In this example, the ADD and SUB instructions are the producer and consumer, respectively, and are performed using specific pipeline execution subunits. The STORE and LOAD instructions are the intervening operations, which are performed, for example, with a load/store unit. Registers are denoted r1, r2, and r3; the STORE and LOAD reference a common memory address denoted by the expression [addr]; and a, b and c are operands in the addition and subtraction operations.

Conventional operation in the above example would proceed as follows. First, the STORE instruction would get its data from the ADD instruction. The LOAD instruction potentially would be stalled due to the memory dependence on the STORE (i.e., as a result of the common address addr). Conventional store-to-load forwarding within the load/store unit would be used to provide the data to the LOAD. The SUB instruction would in turn get its data from the LOAD instruction.

The novel method herein acts in this example via a dynamic assessment that the intervening STORE and LOAD operations are an identity function. The [addr] expression involves a calculation, and it is not apparent that the STORE and LOAD are communicating through memory until the address calculation for each is complete. In this case, the common result of the address calculation reveals an identity function, and therefore an affirmative dynamic detection of the forwarding opportunity. Specifically, the address calculation dynamically reveals equality between the output of the producer (the ADD instruction) and the input to the consumer (the SUB instruction). Stated from the perspective of the intervening operations that link the producer and consumer, those operations are an identity because they have an input (the result of the producing ADD instruction) which is equal to their output (the LOAD data provided to the SUB instruction).

The forwarding opportunity having been thus detected, the data is forwarded directly from the producer to the consumer. Specifically, the SUB instruction gets its data directly from the ADD instruction, because the intervening instructions compose an identity. As described in further detail below, forwarding may be performed via multiplexed control of a bypass network selective coupling the execution units performing the ADD and SUB operations.

Even with this forwarding, the STORE instruction typically still gets its data from the ADD instruction, and the LOAD instruction still gets its data through internal forwarding in the load/store unit and handles writing the result to register r2. But the SUB instruction does not have to wait for these operations, because in parallel it has directly received its data as soon as the ADD instruction produced its output value in register r1. The SUB instruction can thus proceed immediately, and even at a point in time when the data it needs may be still unavailable from the load/store portion of the pipeline. Although this example contemplates two intervening operations, the invention encompasses the possibility of one intervening operation or more than two intervening operations.

This discussion will now turn to an exemplary environment in which the foregoing and other examples may be carried out. FIG. 1 shows aspects of an example micro-processing and memory system 100 (e.g., a central processing unit or graphics processing unit of a personal computer, game system, smartphone, etc.) including a processor core 102. Although the illustrated embodiment includes only one processor core, it will be appreciated that the micro-processing system may include additional processor cores in what may be referred to as a multi-core processing system. The microprocessor core/die variously includes and/or may communicate with various memory and storage locations 104.

The memory and storage locations 104 may include L1 processor cache 106, L2 processor cache 108, L3 processor cache 110, main memory 112 (e.g., one or more DRAM chips), secondary storage 114 (e.g., magnetic and/or optical storage units) and/or tertiary storage 116 (e.g., a tape farm). The processor core 102 may further include processor registers 118. Some or all of these locations may be memory-mapped, though in some implementations the processor registers may be mapped differently than the other locations, or may be implemented such that they are not memory-mapped. It will be understood that the memory/storage components are listed above in increasing order of access time and capacity, though there are possible exceptions. In some embodiments, a memory controller may be used to handle the protocol and provide the signal interface required of main memory, and, typically, to schedule memory accesses. The memory controller may be implemented on the processor die or on a separate die. It is to be understood that the locations set forth above are non-limiting and that other memory/storage locations may be used instead of, or in addition to, those described above without departing from the scope of this disclosure.

The micro-processor 102 includes a processing pipeline which typically includes one or more of fetch logic 120, decode logic 122 (referred to herein as a hardware decoder or hardware decode logic), execution logic 124, mem logic 126, and writeback logic 128. Note that one or more of the stages in the processing pipeline may be individually pipelined to include a plurality of stages or subunits to perform various associated operations.

The fetch logic 120 retrieves instructions from one or more of the memory locations (e.g., unified or dedicated L1 caches backed by L2-L3 caches and main memory). In some examples, instructions may be fetched and executed one at a time, possibly requiring multiple clock cycles. Fetched instruction code may be of various forms. In addition to instructions natively executable by the execution logic of the processor core, fetch logic may also retrieve instructions compiled to a non-native instruction ISA. One illustrative example of a non-native ISA that the micro-processing system may be configured to execute is the 64-bit Advanced RISC Machine (ARM) instruction set; another is the x86 instruction set. Indeed, the full range of non-native ISAs here contemplated includes reduced instruction-set computing (RISC) and complex instruction-set computing (CISC) ISAs, very long instruction-word (VLIW) ISAs, and the like. The ability to execute selected non-native instructions provides a practical advantage for the processing system, in that it may be used to execute code compiled for pre-existing processing systems.

Such non-native instructions may be decoded by the decode logic 122 into the native ISA to be recognized by the execution logic 124. For example, the hardware decoder may parse op-codes, operands, and addressing modes of the non-native instructions, and may create a functionally equivalent, but non-optimized set of native instructions. When the fetch logic retrieves a non-native instruction, it routes that instruction through the hardware decoder to a scheduler 210 (shown in FIG. 2 as part of the execution logic). On the other hand, when the fetch logic retrieves a native instruction, that instruction is routed directly to the scheduler, by-passing the hardware decoder. Upon being decoded, the instructions may be dispatched by the scheduler to be executed by an execution pipeline of the execution logic.

For operations that produce a primary result (e.g., as opposed to those that perform a branch to another location in the executing program), writeback logic writes the result to an appropriate location, such as a processor register. In load/store architectures, mem logic performs load and store operations, such as loading an operand from main memory into a processor register.

As will be discussed in further detail below, the execution logic may be controlled based on data forwarding opportunities that may be detected as early as when an instruction is decoded by the decode logic. During such data forwarding opportunities, control by the scheduler may be overridden in order to internally forward data directly from one subunit to another subunit of the execution pipeline so that data is made available for consumption more quickly than if it were loaded by the mem logic.

It should be understood that these five stages are somewhat specific to, and included in, a typical RISC implementation. More generally, a microprocessor may include fetch, decode, and execution logic, with mem and writeback functionality being carried out by the execution logic. For example, the mem and writeback logic may be referred to herein as a load/store portion or load/store unit of the execution logic. Further, it should be understood that the micro-processor system is generally described in terms of an in-order processing system, in which instructions are retrieved and executed in substantially the same order—i.e., without resequencing in the scheduler. Correspondingly, the execution logic may include an in-order execution pipeline in which instruction are executed in the order in which they are dispatched. The present disclosure is equally applicable to these and other microprocessor implementations, including hybrid implementations that may use out-of order processing, VLIW instructions and/or other logic instructions.

Figure 2:
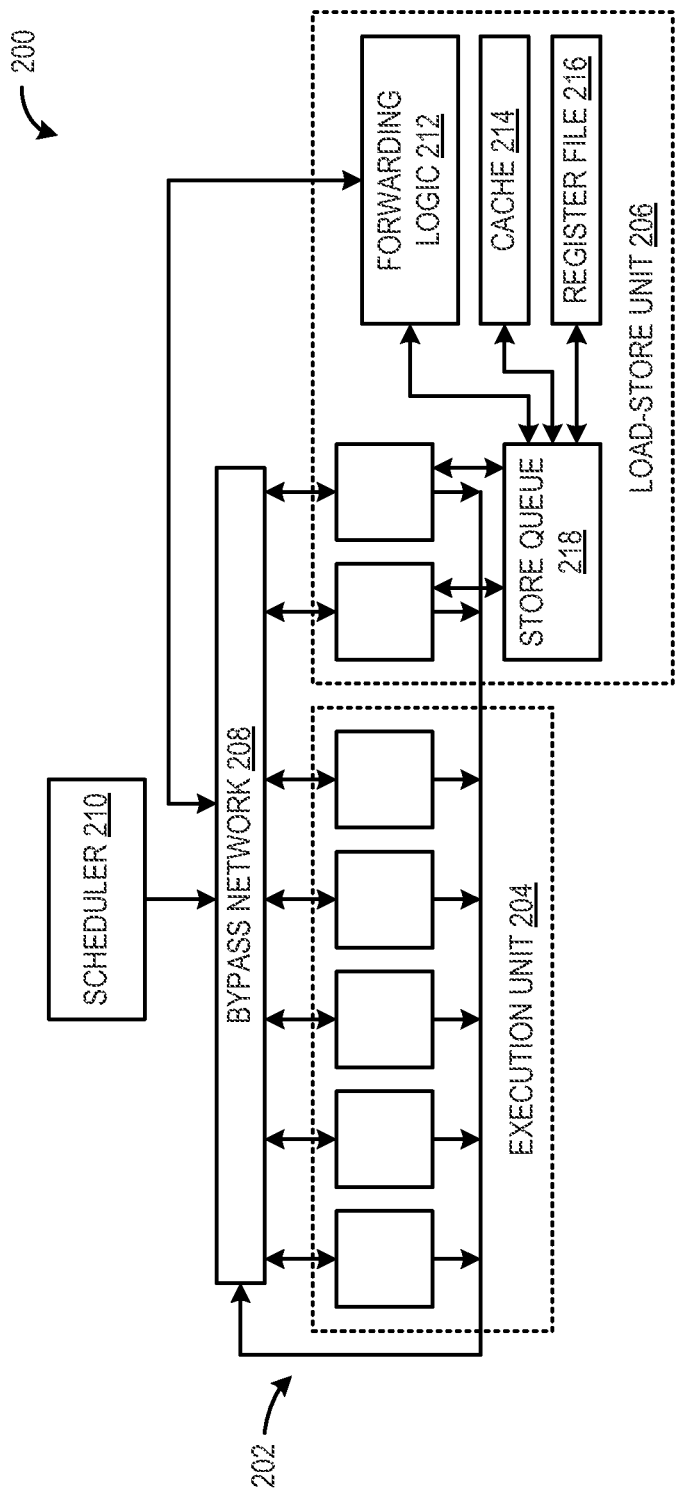
FIG. 2 schematically shows an execution pipeline in accordance with an embodiment of the present disclosure.

FIG. 2 schematically shows an execution pipeline 200 in accordance with an embodiment of the present disclosure. For example, the execution pipeline may be implemented in the execution logic 128 (and mem and writeback logic) of the micro-processor and memory system 100 shown in FIG. 1. Although it should be appreciated that one or more of the illustrated logic components may be implemented in different portions of the micro-processor and memory system.

The execution pipeline includes a plurality of logic subunits 202 that is configured to execute instructions. In one example, in an in-order pipeline implementation, the subunits may be arranged in a particular sequence based on the design of the pipeline to handle in-order execution of instructions. The execution pipeline is arranged into an execution unit (or portion) 204 and a load/store unit (or portion) 206. The execution unit includes execution subunits such as integer execution units, floating point execution units, arithmetic logic units, etc. The execution unit may be configured to execute various micro-operations including add, subtract, compare, multiply, divide and other logical operations as well as a subset of memory operations.

The load/store unit 206 includes load/store subunits as well as forwarding logic 212, a memory cache 214, a register file 216, and a store queue 218. The load/store unit may be configured to execute load/store micro-operations. Depending on the type of instruction being executed, data may flow through the register file or the memory cache. The store queue (or store buffer) may be positioned between the load/store subunits and the register file and the cache. Because of the depth of the pipeline and the need to efficiently minimize writes to the register files or memory cache, many stores operation can be held temporarily in a store queue before ultimately being written to the register file or the cache. In some embodiments, the store queue may be omitted and/or the register file and the cache may be directly connected to the load/store subunits.

In some embodiments, the execution pipeline may include additional execution units and/or load/store units to provide additional parallelism. In some implementations, the load/store unit may be grouped with the execution unit, but the execution pipeline may still provide load/store functionality that may be referred to as the load/store portion. It will be appreciated that the execution pipeline may include any suitable number and type of subunits or stages, arranged in any suitable order, without departing from the scope of the present disclosure.

A bypass network 208 is operatively coupled with the execution pipeline 200. The bypass network is configured to forward data produced at one or more subunits to another subunit to be consumed as an input. More particularly, the bypass network includes one or more multiplexers operatively coupled to one or more of the subunits. The multiplexors may be controlled by the scheduler 210 or forwarding logic 212. Specifically, the scheduler or forwarding logic provides an input to a select line of one or more of the multiplexers to control a selection of a subunit as a destination to forward data produced by another subunit or other location.

In one example, the bypass network is connected to the subunits such that each execution subunit can obtain data from all the other execution subunits as well as the load/store subunits via the bypass network. Similarly, each load/store subunit can obtain data from any of the execution subunits as well as the other load/store unit via the bypass network. It will be appreciated that each subunit may include one or more flip-flops, latches, or other state element to transiently store data received from the bypass network. The multiplexor(s) may be controlled by the scheduler or the forwarding logic depending on operating conditions.

As discussed above, the scheduler 210 may receive natively executable instructions, either from the fetch logic or from the hardware decoder. The scheduler is configured to dispatch the instructions, as appropriate, to the execution pipeline and control the execution pipeline and the bypass network to execute the instructions. As instructions are executed in the execution subunits of the execution pipeline, a sequence of logical and/or arithmetic results evolves therein. The load/store subunits store these results in the memory cache. In some embodiments, the load/store subunits may be coupled to the register file, and the load/store subunits may store results in appropriate registers of the register file. In other embodiments, the bypass network may be coupled to the register file, and the results may be stored in appropriate registers of the register file via the bypass network.

In some cases, the scheduler may control the bypass network to forward data from the load/store unit to a particular subunit in the execution pipeline based on a data forwarding opportunity. In particular, the scheduler may detect data forwarding opportunities based on data dependencies of instructions being executed in the pipeline. Such data dependencies may be detected as early as the decode stage of the processing pipeline by determining consumer and producer characteristics of instructions to be executed. For example, data dependencies may be detected by determining whether instructions have common locations. For example, a data dependency may occur if two instructions share a common register location. In one example, the scheduler may detect a data dependency by performing a register location comparison of a store instruction and a load instruction that is younger than the store instruction. Detecting dependences when data flows through the register file may be more straightforward than when data flows through memory, since register names can be more or less fixed at the time of issue. Dependences that flow through memory locations may be more complex to detect because address computation has to be done before dependences can be detected.

Depending on when the required data is produced and when it is needed for consumption, the scheduler can control the bypass network to forward data from the register file to a particular subunit if the data is available for use by the load/store unit. Otherwise, the scheduler stalls the dependent instructions in the execution pipeline until the data becomes available for use by the load/store unit to be forwarded to the consuming subunit via the bypass network. In the case of data dependencies having a common memory address (e.g., cache, queue, etc.), as the scheduler does not know the address information, it may speculatively issue a dependent instruction (e.g., a load) before the older instruction (e.g., store) has had a chance to finish execution. If the load/store sub-units detect that there is in fact a conflict (e.g., the store needs to forward to the load), the dependent instruction may be stalled within the load/store unit, and thereby indirectly stalling the consumers of the dependent instruction, or if the consumers of the dependent instruction have been speculatively issued assuming that the dependent instruction could complete in time to be consumed, the consumers of the output of the dependent instruction may have to be squashed and replayed when the dependent instruction cannot produce output data in time. Such operation of the scheduler may cause delays relative to the novel data forwarding techniques discussed herein.

The forwarding logic 212 may be configured to detect data forwarding opportunities where the data is yet unavailable for use by the load/store unit. For example, the forwarding logic may detect one or more operations whose input is the output data from a producing execution subunit (a.k.a. an originating operation) and whose output is the input data to the consuming execution subunit (a.k.a. a final operation). The forwarding logic may evaluate those one or more intervening operations to determine whether their execution would compose an identify function in which the input to the one or more intervening operations is equal to the output of the one or more intervening operations.

In one example, the intervening operations that may compose the identity function may include a store instruction followed by a load instruction having a common or shared memory address. In one example, the forwarding logic detects a forwarding opportunity when a load instruction has an address that matches an address of a store instruction that follows the store instruction. Further, the data from the store instruction may not be stored at that address at the time of execution of the load instruction. In some cases, the load instruction immediately follows the store instruction in a next cycle of the execution pipeline. In some cases, the load instruction follows the store instruction by two or more cycles of the execution pipeline with one or more other instructions in between. It will be appreciated that the load instruction may follow the store instruction by any suitable number of cycles and still be forwarded by the forwarding logic as long as the data from the store instruction is unavailable for use by the load/store unit. It will be appreciated that these are but a few examples of data forwarding opportunities that may be detected by the forwarding logic and other forwarding opportunities may be contemplated.

If the one or more intervening operations would compose such an identity function then a data forwarding opportunity may be detected by the forwarding logic, and the forwarding logic may control the bypass network to forward the producing execution subunit's output data directly to the consuming execution subunit. The output data may be forwarded internally within the execution unit of the processing pipeline without passing through the load/store unit. The output data may be forwarded at a point in time prior to the output data being available to the load/store portion of the execution pipeline that would otherwise send the output data to the consuming execution subunit. In other words, the forwarded data bypasses the load/store unit including the load/store subunits, the store queue, the register file and the cache in favor of flowing directly from the producing execution subunit to the consuming execution subunit via the bypass network. The consumer subunit thus obtains the load data internally without the need for the data to go to the load/store unit as store data and then back again as load data. Accordingly, the time for the data to be made available to the consuming subunit may be reduced by the number of clock cycles it would take to perform the load and store operations. Although it will be appreciated that the output data may be sent to the load/store unit independent of being forwarded within the execution unit to make sure that the output data is stored in memory.

In one example, the forwarding logic controls the bypassing network by providing an input to a select line of one or more multiplexers of the bypass network to select an execution subunit as a destination to which to forward the data.

Furthermore, the forwarding logic overrides the control of the bypass network and the execution pipeline by the scheduler to provide the appropriate control to bypass the data directly to the consumer execution subunit from the producer execution subunit. If control was not relinquished to the forwarding logic, the scheduler would otherwise control the execution pipeline to stall execution until the data would become available for use by the load/store portion of the execution pipeline (e.g., the data is at the location designated by the store instruction). Or the dependent instruction may be speculatively executed by the scheduler, which may result in rollback. Such operation would take at least several clock cycles more than the internal forwarding performed by the forwarding logic and potentially longer if an instruction would have to be replayed due to a data miss in the load/store unit. Note that if the data is available for use by the load/store unit at the location, then the forwarding logic may not takeover control and the scheduler may handle forwarding of the data from the load/store unit to the consuming subunit.

In some embodiments, during a data forwarding operation, the forwarding logic may be configured to control the bypass network to send data received from the producing execution subunit to the load/store unit and the consuming execution subunit in parallel. The forwarding logic may send the data to the load/store unit (e.g., the store queue) as well as the consuming execution subunit in order store the output data in memory to keep the load/store unit updated for execution of future instructions and data forwarding operations.

Figure 3:
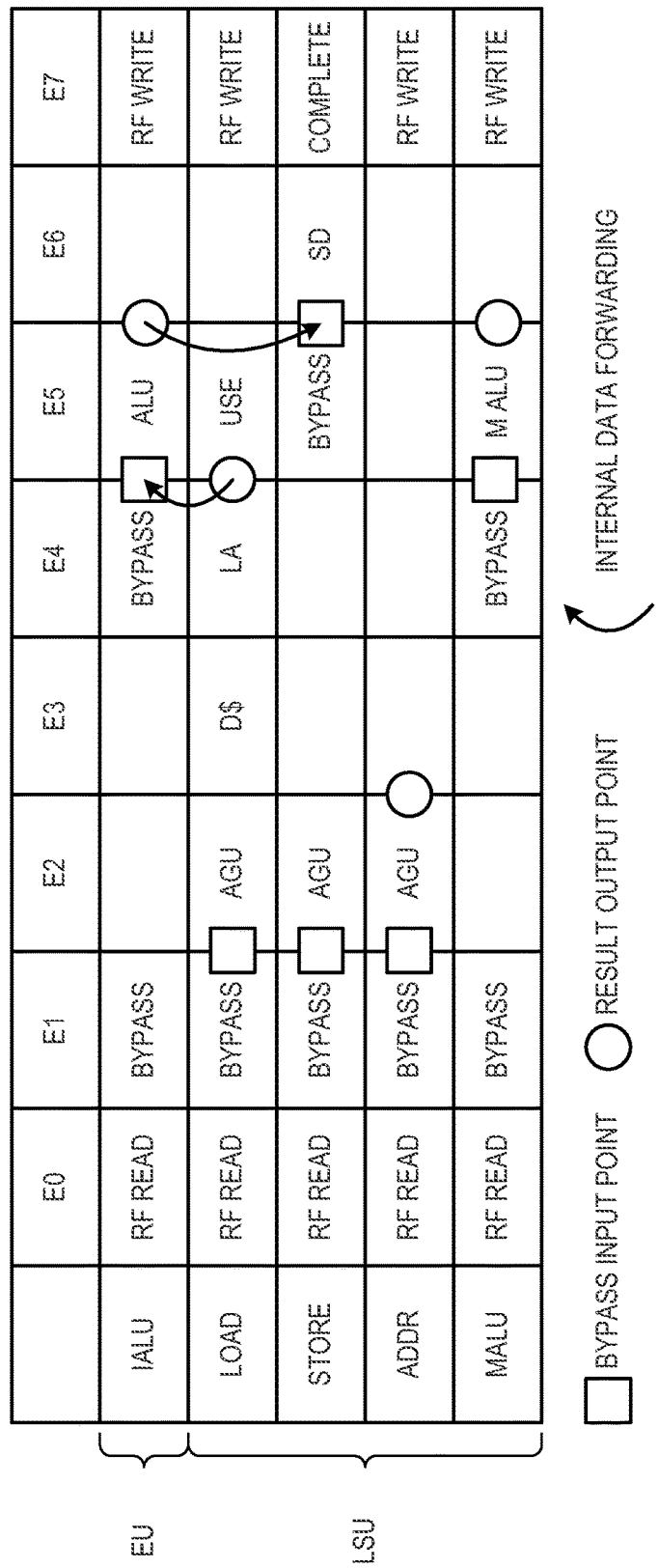
FIG. 3 shows an example of store-to-load data forwarding opportunities in an execution pipeline in accordance with an embodiment of the present disclosure.

FIG. 3 shows examples of store-to-load data forwarding opportunities in an execution pipeline in accordance with an embodiment of the present disclosure. For example, the illustrated examples may be performed by the execution pipeline 200 shown in FIG. 2. The execution pipeline includes an execution unit (EU) and a load/store unit (LSU). The EU includes an integer arithmetic logic subunit (IALU). The LSU includes a load subunit (LOAD), a store subunit (STORE), an address generation unit (ADDR) for memory operations, and a memory arithmetic logic unit (MALU) for handling operations dealing with segment address generation for memory operations. Note that for the sake of clarity, the EU and the LSU are shown in simplified form. It will be understood that the EU and the LSU may include additions subunits or other logic elements.

In the illustrated example, the execution pipeline includes eight stages (i.e., E0-E7). Register file reads may be performed in stage E0. Early of bypassing register contents into address generation, integer operations etc. may be performed in stage E1. Address generation for memory operations may be performed in stage E2. Data reads from caches for memory operations may be performed in stage E3. Load data (from caches or store buffers/queues) may be available for use by the execution units in stage E4. Execution of various instructions may be completed in stage E5. Store data may be written into store queues in stage E6. Data may be written to register files in E7. Furthermore, in this example, operands for an instruction being executed in the pipeline may be consumed from the register-file read (or other memory location) of the bypass network either early in stage E1 or late in stage E4. Note that a state elements (e.g., latch, flip flop, etc.) may be positioned between each stage to temporarily hold data to be consumed or produced by a stage. In some examples, the bypass network may be read in a different stage or stages of the execution pipeline. It will be appreciated that this is merely one example. It should be understood that the execution pipeline may include a suitable number of stages and may perform different operations in a suitable order without departing from the scope of the present disclosure.

The execution pipeline shows various instructions being executed. For example, a store instruction is executed by the STORE subunit and includes the following sequence of operations. The register file is read in stage E0 to determine whether data for the store instruction is available. The operands to compute the virtual address to store the data of the store instruction are read off the bypass network in stage E1. The virtual address is computed by an address generation subunit (AGU) in stage E2. The cache (D$) tags (and state bits, etc.) are accessed in parallel with a translation look ahead buffer in order to translate the virtual address to a physical address in stage E3. The physical address is compared against the virtual address and prepared for consumption by a load alignment subunit (LA) in stage E4. Store data is read off the result bypass network in stage E5. Store instructions are queued in the store queue (and possibly combined) before being eventually written into the cache. The store queue forwards data from recent stores to subsequent loads with matching addresses until the stores are drained into the cache asynchronously. The address of a store instruction is written in the stage E3 and the data is written in the stage E6.

As another example, a load instruction is executed by the LOAD subunit and includes the following sequence of operations. The register file is read in stage E0 to determine whether data for the load instruction is available. The operands to compute the virtual address to load the data of the load instruction are read off the bypass network in stage E1. The virtual address is computed by the AGU in stage E2. The cache (D$) tags (and state bits, etc.) are accessed in parallel with a translation look ahead buffer in order to translate the virtual address to a physical address in stage E3. The physical address is compared against the virtual address and prepared for consumption by the LA in stage E4. In addition to the tag compare, the address is compared against the addresses of stores in the store queue. Depending on whether the load hits in the store queue, the load data is obtained from either the store queue or the cache in stage E5.

In an internal data forwarding opportunity where a store instruction is followed immediately by a load instruction with a matching address, the address match is determined early in stage E3 stage by a hit in the store queue in the LSU. The data for the store instruction becomes available on the bypass network in stage E5 (which aligns with stage E4 of the load unit). For all load instructions followed by instructions that involve the EU (e.g., integer Uops), the scheduler controls the bypass network so that the potential EU consumer subunits can read the load data off the bypass network in stage E4. However, in this immediate cycle forwarding case, the forwarding logic overrides the bypass control from the scheduler and bypasses the store data to the load consumer. Thus the bypassing is done internal to the EU utilizing the bypass network within the EU. The store data is also read in parallel by the LSU and entered into the store queue and then eventually into the cache for future instructions.

Figure 4:
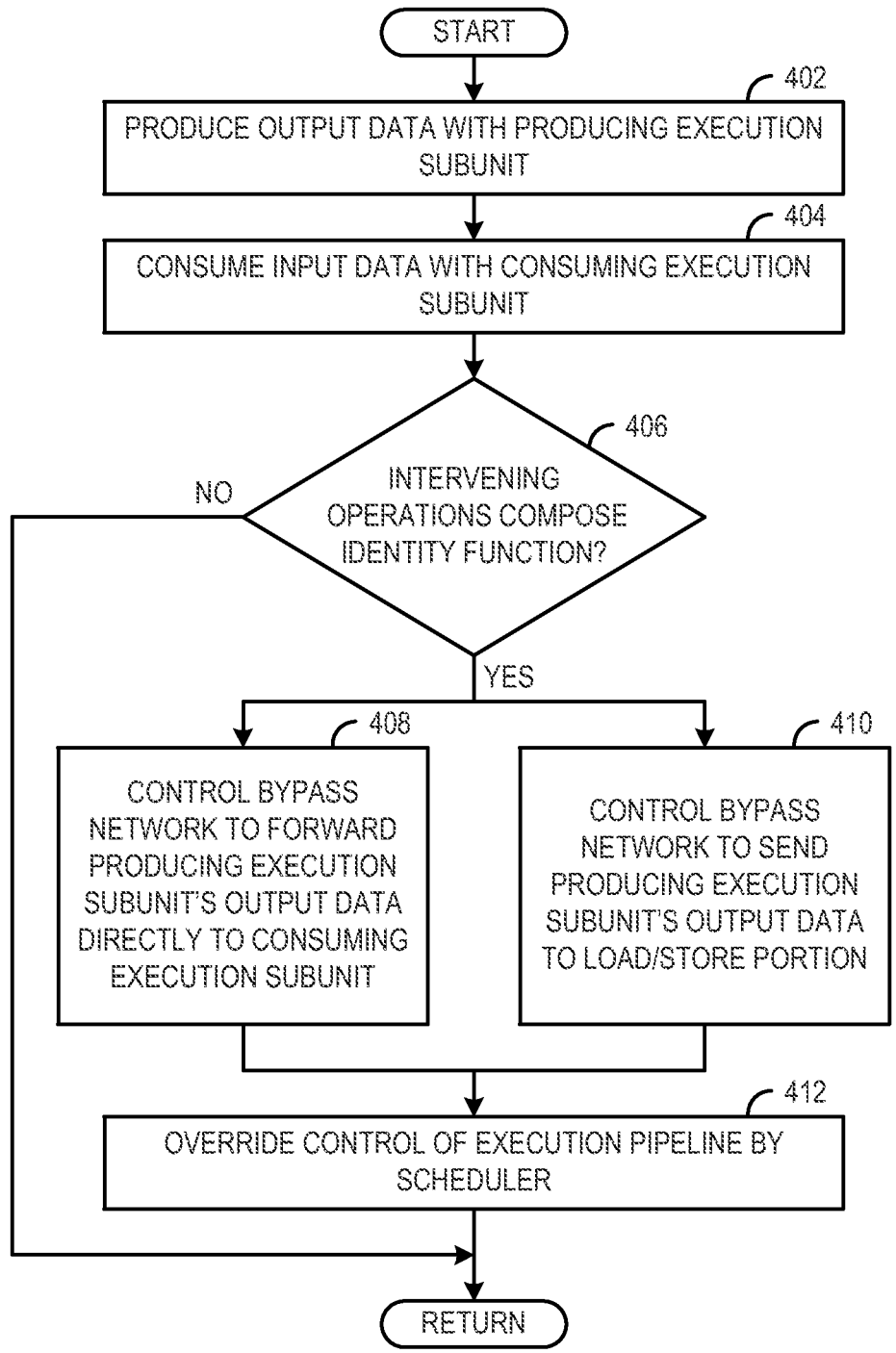
FIG. 4 shows a flow chart of a method for controlling a microprocessor in accordance with an embodiment of the present disclosure.

FIG. 4 shows a flow chart of a method 400 for controlling a microprocessor in accordance with an embodiment of the present disclosure. The method 400 may be implemented with any suitable software/hardware, including configurations other than those shown in the foregoing examples. In some cases, however, the process flows may reference components and processes that have already been described. For purposes of clarity and minimizing repetition, it may be assumed that these components/processes are similar to the previously described examples. For example, the method may be performed in an execution pipeline having a plurality of execution subunits. The method may use a bypass network to directly forward data from a producing execution subunit to a consuming execution subunit of the plurality of execution subunits based on a forwarding opportunity.

At 402, the method 400 may include producing output data with a producing execution subunit. The producing execution subunit may produce output data for a consuming or younger instruction or micro-operation in a sequence of instructions that may be executed in the execution pipeline.

At 404, the method 400 may include consuming input data with a consuming execution subunit. For example, the consuming execution subunit may be downstream of the producing execution subunit in the execution pipeline.

At 406, the method 400 may include for one or more intervening operations whose input is the output data from the producing execution subunit and whose output is the input data to the consuming execution subunit, evaluating those one or more intervening operations to determine whether their execution would compose an identify function in which the input to the one or more intervening operations is equal to the output of the one or more intervening operations. For example, the intervening operation may include a store instruction followed by a load instruction having a common memory address. In some cases, the load instruction immediately follows the store instruction in a next cycle of the execution pipeline. In one example, the data forwarding opportunity occurs when data from a store instruction is unavailable for use by the load/store portion of the execution pipeline for the load instruction. In implementations where the load/store portion of the execution pipeline includes one or more of a store queue and a memory location of a cache, the forwarding opportunity occurs when data from the store instruction is unavailable for the load instruction in any one of the store queue or the memory location of the cache. If it is determined that the execution of the intervening operations compose an identity function in which the input to the intervening operations is equal to the output of the intervening operations, then the method 400 moves to 408. Otherwise, the method 400 returns to other operations.

At 408, the method 400 may include controlling a bypass network to forward the producing execution subunit's output data directly to the consuming execution subunit. In one example, the bypass network includes one or more multiplexers operatively coupled to one or more of the execution subunits, and controlling the bypass network includes providing an input to a select line of the one or more multiplexers to control selection of an execution subunit to send the data. The output data may be forwarded directly to the consuming execution subunit via the bypass network at a point in time prior to the output data being available to the load/store portion of the execution pipeline that is to send the output data to the consuming execution subunit.

At 410, the method 400 includes controlling the bypass network to send data received from the producing subunit to the load/store portion and the consuming subunit in parallel. The data may be sent to the load/store portion in parallel with the internal forwarding so that is can be made available for future instructions in a timely manner.

At 412, the method 400 may include overriding control by a scheduler that would otherwise control the execution pipeline to stall execution of a load instruction until the data becomes available for use by the load/store portion of the execution pipeline for the load instruction or would speculatively issue the intervening operations before the output data would be available that may result in rollback. By overriding control by the scheduler, the execution pipeline may be prevented from being stalled while waiting for the store data to become available for used by the load/store portion of the execution pipeline or causing rollback.

By controlling operation of the execution pipeline and the bypass network to internally forward data within an execution unit based on a data forwarding opportunity, data may be made available for consumption more quickly than if the data were stored in a load/store portion of the execution pipeline and then loaded from the load/store portion. Accordingly, stalls of the execution pipeline or rollback may be reduced, and performance of the micro-processing system may be increased.

It will be understood that some of the method steps described and/or illustrated herein in some embodiments may be omitted without departing from the scope of this disclosure. Likewise, the indicated sequence of the method steps may not always be required to achieve the intended results, but is provided for ease of illustration and description. One or more of the illustrated actions, functions, or operations may be performed repeatedly, depending on the particular strategy being used.

While the depicted method may be performed in connection with any suitable hardware configuration, it will be appreciated that modifications, additions, omissions, and refinements may be made to these steps in accordance with method descriptions included above and described with references to the hardware and systems shown in FIGS. 1 and 2.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. In an execution pipeline having a plurality of execution subunits, a method of using a bypass network to directly forward data from a producing execution subunit to a consuming execution subunit, the method comprising:
producing output data with the producing execution subunit;
consuming input data with the consuming execution subunit;
for one or more intervening operations whose input is the output data from the producing execution subunit and whose output is the input data to the consuming execution subunit, evaluating those one or more intervening operations to determine whether their execution would compose an identity function in which the input to the one or more intervening operations is equal to the output of the one or more intervening operations; and
if the one or more intervening operations would compose such an identity function, controlling the bypass network to forward the producing execution subunit's output data directly to the consuming execution subunit.

2. The method of claim 1, where the evaluating of the one or more intervening operations includes determining whether the one or more intervening operations include a store instruction followed by a load instruction having a common memory address.

3. The method of claim 2, where the load instruction immediately follows the store instruction in a next cycle of the execution pipeline.

4. The method of claim 1, where the output data is forwarded directly to the consuming execution subunit at a point in time prior to the output data being available to a load/store portion of the execution pipeline that is to send the output data to the consuming execution subunit.

5. The method of claim 4, where the load/store portion of the execution pipeline includes one or more of a store queue and a memory location in a cache, and the output data is forwarded directly to the consuming execution subunit at a point in time prior to the output data being available to a load/store portion of the execution pipeline that is to send the output data to the consuming execution subunit.

6. The method of claim 4, further comprising:
overriding control by a scheduler that would otherwise control the execution pipeline to stall execution by the consuming execution subunit until the output data becomes available for use by the load/store portion of the execution pipeline to send to the consuming execution subunit.

7. The method of claim 4, further comprising:
controlling the bypass network to send the output data received from the producing execution subunit to the load/store portion and the consuming execution subunit in parallel.

8. The method of claim 1, where the bypass network includes one or more multiplexers operatively coupled to one or more of the execution subunits, and where controlling the bypass network includes providing an input to a select line of the one or more multiplexers to select the consuming execution subunit as a destination to forward the output data.

9. A micro-processing and memory system comprising:
an execution pipeline with a plurality of execution subunits, the execution subunits including a producing execution subunit configured to produce output data and a consuming execution subunit configured to consume input data;
a bypass network operatively coupled with the execution pipeline, the bypass network being configured to forward data produced by one execution subunit directly to another execution subunit; and
forwarding logic configured to, for one or more intervening operations whose input is the output data from the producing execution subunit and whose output is the input data to the consuming execution subunit, (i) evaluate those one or more intervening operations to determine whether their execution would compose an identity function in which the input to the one or more intervening operations is equal to the output of the one or more intervening operations; and (ii) if the one or more intervening operations would compose such an identity function, control the bypass network to forward the producing execution subunit's output data directly to the consuming execution subunit.

10. The micro-processing and memory system of claim 9, where the evaluation performed by the forwarding logic includes determining whether the one or more intervening operations include a store instruction followed by a load instruction having a common memory address.

11. The micro-processing and memory system of claim 10, where the load instruction immediately follows the store instruction in a next cycle of the execution pipeline.

12. The micro-processing and memory system of claim 9, where the output data is forwarded directly to the consuming execution subunit prior to the output data being available to a load/store portion of the execution pipeline that is to send the output data to the consuming execution subunit.

13. The micro-processing and memory system of claim 12, where the load/store portion of the execution pipeline includes one or more of a store queue and a memory location in a cache, and where the output data is forwarded directly to the consuming execution subunit at a point in time prior to it being available in any of such store queue or memory location.

14. The micro-processing and memory system of claim 12, where the forwarding logic is configured to control the bypass network to send the output data received from the producing execution subunit to the load/store portion and the consuming execution subunit in parallel.

15. The micro-processing and memory system of claim 9, where the bypass network includes one or more multiplexers operatively coupled to one or more of the execution subunits, and the forwarding logic is operatively coupled to a select line of the one or more multiplexers to select the consuming execution subunit as a destination to forward the output data.

16. A micro-processing and memory system comprising:
an execution pipeline with a plurality of execution subunits, the execution subunits including a producing execution subunit configured to produce output data and a consuming execution subunit configured to consume input data;
a bypass network operatively coupled with the execution pipeline, the bypass network being configured to send data produced by one execution subunit directly to another execution subunit; and
forwarding logic configured to, for two or more intervening operations whose input is the output data from the producing execution subunit and whose output is the input data to the consuming execution subunit, (i) detect whether those two or more intervening operations include a store instruction followed by a load instruction having a common memory address; and (ii) if the two or more intervening operations do include such a store and load instruction, control the bypass network to forward the producing execution subunit's output data directly to the consuming execution subunit.

17. The micro-processing and memory system of claim 16, where the load instruction immediately follows the store instruction in a next cycle of the execution pipeline.

18. The micro-processing and memory system of claim 16, where the output data is forwarded directly to the consuming execution subunit at a time prior to the output data being available to a load/store portion of the execution pipeline that includes one or more of a store queue, and a memory location of a cache, and where the output data is forwarded directly to the consuming execution subunit at a point in time prior to it being available in any of such store queue or memory location.

19. The micro-processing and memory system of claim 18, where the forwarding logic is configured to control the bypass network to send the output data received from the producing execution subunit to the load/store portion and the consuming execution subunit in parallel.

20. The micro-processing and memory system of claim 16, where the bypass network includes one or more multiplexers operatively coupled to one or more of the execution subunits, and the forwarding logic is operatively coupled to a select line of the one or more multiplexers to select the consuming execution subunit as a destination to forward the output data.

* * * * *